Aug. 15, 1939.    O. V. PAYNE    2,169,326
MOTOR DRIVEN LET-OFF
Original Filed April 11, 1938    2 Sheets-Sheet 1
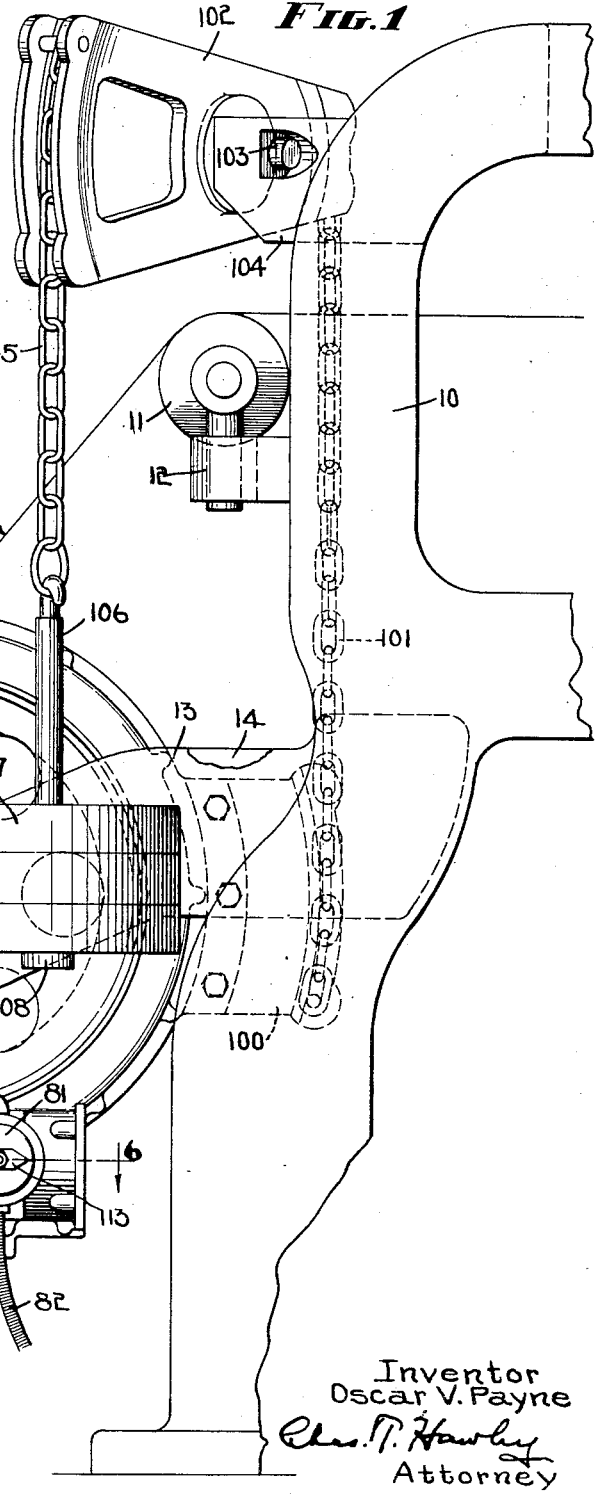
Inventor
Oscar V. Payne
Attorney Aug. 15, 1939.   O. V. PAYNE   2,169,326
MOTOR DRIVEN LET-OFF
Original Filed April 11, 1938   2 Sheets-Sheet 2
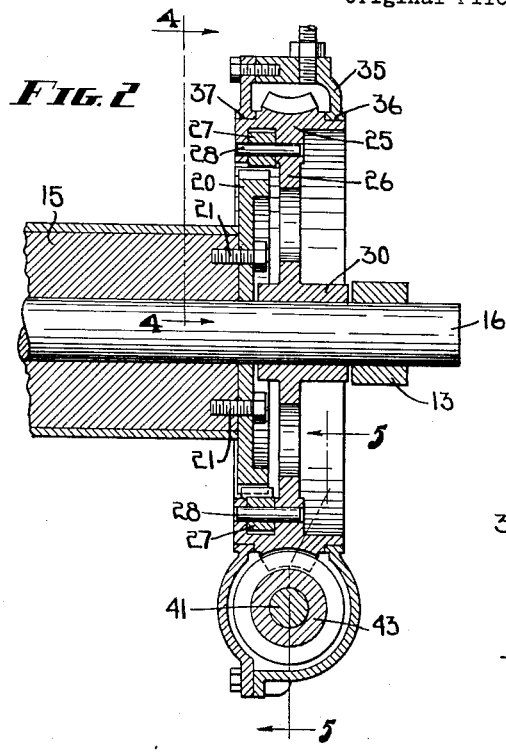
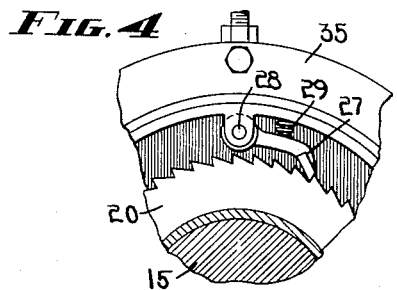
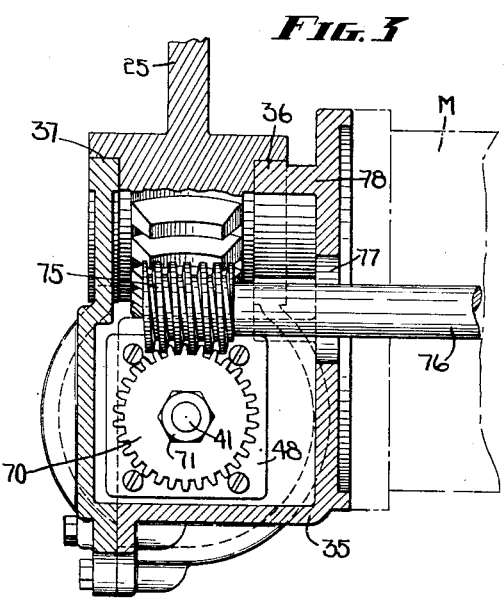
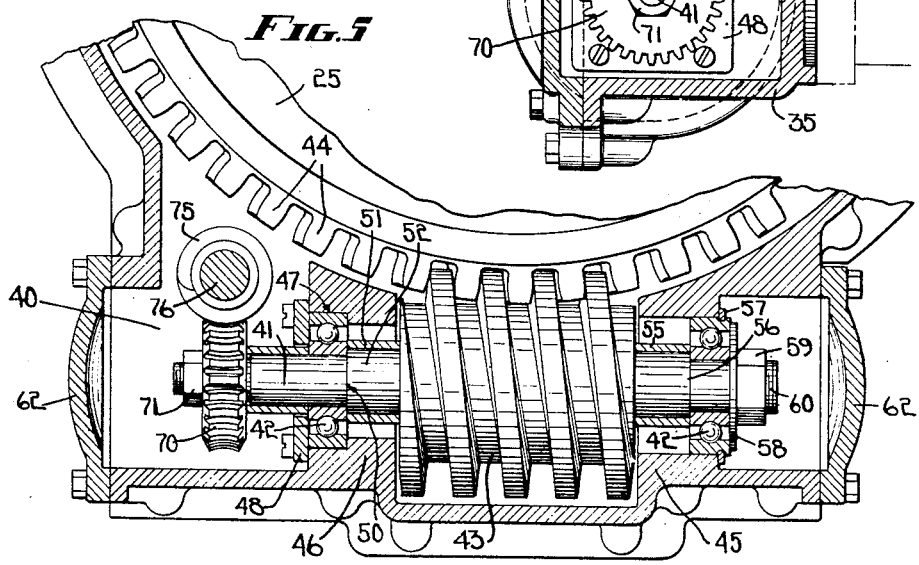
Inventor
Oscar V. Payne
Attorney Patented Aug. 15, 1939

2,169,326

UNITED STATES PATENT OFFICE 2,169,326

MOTOR DRIVEN LET-OFF

Oscar V. Payne, Leicester, Mass., assignor to Crompton & Knowles Loom Works, Worcester, Mass., a corporation of Massachusetts Application April 11, 1938, Serial No. 201,340
Renewed January 17, 1939

15 Claims. (Cl. 139—100)

This invention relates to let-offs for looms and it is the general object of the invention to provide a motor driven control for the letoff.

In the weaving of relatively heavy fabrics it is necessary to maintain considerable tension on the warp threads. As shown hereinafter I maintain this tension by means of a weight the position of which changes as the warp beam unwinds during weaving. The weight will ordinarily rise from a given low to a given high position through a range which will preserve substantially uniform tension on the warp threads. When the weight has reached the upper limit of its range it is necessary to return it to the lower limit so that another period of operation may ensue during which the weight is lifted through the range. It is an important object of my present invention to effect the descent of the weight by means of an electric motor acting through a worm and worm wheel, the motor to start operation when the weight nears the upper limit of its range and completing its turning when the weight approaches the low limit of its range.

It is a further object of my present invention to introduce between the motor and the weight a form of connection which will serve as a lock for the weight so constructed that a comparatively small force supplied by the motor will change the position of the lock and allow the weight to descend. This connection may conveniently take the form of a worm and worm wheel so designed that the angle of the teeth of the worm wheel is very small. When this angle is approximately four degrees sufficient frictional resistance to turning is present to sustain the weight but the worm can be turned in a direction to permit the descent of the weight by the expenditure of a very small amount of electric energy.

It is another object of my present invention to mount the motor so it moves with the weight, preferably on a casing which carries the worm, and provide a reduction drive between the worm wheel and motor all supported by and moving with the casing. In this way the driving connection between the worm gear and the motor can be maintained in correct relationship and the weight of the motor can be added to the weight which normally stresses the casing.

It is another object of my present invention to provide some form of gravity switch, such as those wherein the circuit is closed by mercury, to be mounted on the casing, the position of this switch to be changed by rotation of the warp beam during ascent of the weight. By appropriately setting the switch the circuit through the motor can be completed when the weight reaches any desired height and will remain closed sufficiently long to permit the weight to reach the lower limit of the aforesaid range. In this connection I find it convenient to employ switches which are not too sensitive in their response to a change of angular position. In a switch of this kind I find that the axis of the tube along which the mercury flows must become inclined with respect to a horizontal line by several degrees before the mercury will flow to circuit closing position, and conversely when the motor is returning the weight to low position it is necessary for the switch axis to become inclined by several degrees in the opposite direction with respect to a horizontal line before the circuit is broken. This characteristic of the mercury switch gives the weight a comparatively large range of motion and reduces the number of times the motor must be operated during the course of the day's weaving.

I find it advantageous to use an induction type of motor inasmuch as the characteristics of such a motor provide for the gradual starting and stopping of the warp beam, thereby avoiding sudden changes in the tension of the warp.

With these and other objects in view which will appear as the description proceeds, my invention resides in the combination and arrangement of parts hereinafter described and set forth.

In the accompanying drawings, wherein a convenient embodiment of my invention is set forth:

Fig. 1 is a side elevation of the rear part of a loom having my invention applied thereto, Fig. 2 is a vertical section on line 2—2 of Fig. 1, Fig. 3 is a vertical section on line 3—3, Fig. 1 on an enlarged scale, Fig. 4 is a partial vertical section on line 4—4, Fig. 2 showing the pawl and ratchet, Fig. 5 is a detailed vertical section on line 5—5 of Fig. 2, Fig. 6 is a horizontal section on an enlarged scale on line 6—6 of Fig. 1, and Figs. 7 and 8 are diagrammatic views showing the mercury switch illustrated in Fig. 6 in two different positions.

Referring particularly to Fig. 1, I have shown a loom frame 10 having a fixed whip roll 11 supported in stands 12 one of which is shown. Extending rearwardly from the loom frame are two brackets 13 and 14 which support the warp beam 15 through which extends a shaft 16 rotatable in the brackets.

The warp beam has wound thereon warp threads W which pass upwardly as indicated in Fig. 1 over the whip roll 11 and forwardly or to the right to the harness and other weaving instrumentalities not shown. It is to be understood that during operation of the loom the warp W must be supplied by rotation of the beam 15 in a clockwise direction as viewed in Fig. 1, and it will further be understood that the warp must be subjected to a tension in order to weave tight cloth. Since the tension mechanism to be described hereinafter is of the type which subjects the warp to the action of a weight which is raised as the warp feeds forwardly it is desirable that the whip roll 11 be stationary, although I do not wish to be limited to the form of whip roll shown in Fig. 1. The matter thus far described may be of the usual construction and of itself forms no part of my present invention.

In carrying my invention into effect, I provide one end of the beam 15 with a ratchet wheel 20 secured thereto by bolts or screws 21 to cause the ratchet to turn with the beam, as shown in Figs. 2 and 4. A worm gear 25 has a web 26 on which are pivoted two pawls 27 one of which is shown in Fig. 4. Each pawl pivots on a pin 28 carried by the worm gear and is pressed toward the ratchet by means of a light compression spring 29. The pawls and ratchet wheel constitute means for connecting the beam to the worm gear 25 and under normal weaving conditions forward motion of the beam in a clockwise direction as viewed in Fig. 1 will require the worm to move with the beam because of the pawls. Should it be necessary to turn the beam backwardly for any reason with respect to the worm gear this can be done by causing the pawls to slip backwardly over the ratchet wheel. The worm gear 25 has a bearing 30 freely rotatable on the shaft 16. A hollow casing 35 surrounds the worm gear 25 and is rotatable on the gear 25 by means of bearings 36 and 37.

Referring more particularly to Figs. 2, 3 and 5, I have shown the lower end of the casing as formed with a compartment 40 in which is located a shaft 41 rotating in ball bearings 42 carried by the casing. Secured to the shaft 41 is a relatively large worm 43 meshing with the teeth 44 of the worm wheel 25. The casing has right and left webs 45 and 46, respectively, as shown in Fig. 5, through which the shaft 41 extends and between which the worm 43 is located. The latter is therefore confined as to longitudinal motion along the axis of the shaft 41. The left hand ball bearing 42 fits into a pocket 47 in the web 46 and is held therein by a plate 48 fastened to said web 46. A shoulder 50 on the shaft engages part of the left hand ball bearing and a collar 51 surrounding the large part 52 of the shaft is located between the left end of the worm 43 and the left ball bearing. In a similar way a collar 55 around the enlarged central portion 52 of the shaft 41 is located between the right end of the worm 43 and the right hand ball bearing and the latter engages a second shoulder 56 similar to shoulder 50. A ring 57 secured to the right ball bearing engages the web 45 to limit motion of the right hand ball bearing to the left as viewed in Fig. 5. A washer 58 is held in place by a nut 59 carried by the threaded end 60 of the shaft 41.

The relation of the parts described in connection with the shaft 41 is such that the worm and the ball bearings are held securely in place against longitudinal motion in the direction of the axis of shaft 41. The opposite ends of the compartment 40 are normally closed by removable caps 62 which when removed permit assembly of the parts located within the compartment.

Secured to the left end of the shaft 41 is a small worm gear 70 held in place on the shaft by a nut 71. This small worm gear meshes with a small worm 75 secured to one end of a motor shaft 76 extending into the compartment 40 through an opening 77 formed in a motor stand 78. The latter is carried by the lower part of the casing 35 and has the motor M bolted thereto as at 79. The motor is preferably of fractional horsepower alternating current induction type, a one-eighth horsepower motor operating on 110 volts having been found satisfactory.

The motor is supplied with power through a two-wire conduit 80 attached to the top of a switch casing 81 mounted on the main casing 35 and movable angularly therewith about the shaft 16. A feed conduit 82 from a suitable source of power enters the casing 81. One of the wires of the conduit 82, indicated at 85, is connected to a mercury switch H and has an electrode 86 projecting into the tubular part 87 of the switch. A second electrode 88 also projecting into the tube 87 is connected to a wire 89 forming one of the wires of the conduit 80. A mass of mercury 90 in the tube is adapted to electrically connect the otherwise insulated electrodes 86 and 88 so that the wire 89 may be placed in circuit with the wire 85, at which time current will flow from the source through and cause rotation of the motor M.

A relatively broad arm 100 extends forwardly from the casing 35 and is attached to the lower end of a chain 101, the upper part of which is connected to a lever 102 pivoted about a stud 103 carried by a bracket 104 fastened to the loomside. The rear or left end of lever 102 as viewed in Fig. 1 is connected to a depending chain 105 carrying rod 106 on which are mounted weights 107 supported by a head 108 of the rod. The weights may be varied as required and normally act to cause counter-clockwise angular motion of the lever 102 as viewed in Fig. 1 to cause a corresponding counter-clockwise motion of the casing 35 opposed to the feed of the warp threads W.

The mercury switch shown in Figs. 6, 7 and 8 possess a characteristic which is of practical value in the control of the motor M. I find for instance that when the parts are in the position shown in Fig. 7 with the circuit closed within the switch it is necessary to move the tube 87 through a substantial angle before the mercury flows to the left end of said tube. This difference of angle is suggested in Figs. 7 and 8 which set forth one particular form of mercury switch found suitable for use with my invention and so operated as to require a change of approximately 14° angular motion from the position of Fig. 7 to that of Fig. 8 before the contact within the switch is broken. In a similar way it is necessary to move the switch through a corresponding angle of 14° from the position of Fig. 8 to that of Fig. 7 when it is desired to reestablish the circuit. Inasmuch as the switch is directly supported by and movable with the casing 35 and worm gear 25 it will be seen that the warp beam can turn through an angle of 14° before the circuit is closed, and conversely when the motor causes the casing to have a reverse motion a second or negative angular motion of 14° will also be required. Because of this relationship the motor operates at only comparatively infrequent intervals and is not kept in a state of almost constant rotation as would be the case if the switch were sensitive to very slight angular movements.

In operation, weaving will begin with the weights 107 down and with the motor and parts located within compartment 40 in a relatively forward or right hand position as viewed in Fig. 1. The switch H will be in the position shown in Fig. 8 and the motor will therefore be at rest. As weaving continues consumption of the warp will cause rotation of the beam 15 with a gradual angular motion in a clockwise direction as viewed in Fig. 1 to cause a similar motion on the part of the worm gear 25. The angle of the worm and teeth 44 is such that this angular motion is imparted to the casing, the worm being held against rotation because of the small angular lead of its threads. At the same time the weights 107 gradually ascend, exerting a continuous backward tension on the warp threads W which remains more or less constant because of the fact that those parts of the arm 100 and the lever 102 which are engaged by the chains are concentric with pivot 103.

As the beam continues to rotate the time will come when the switch H will be tipped sufficiently to cause the mass of mercury 90 to flow to the opposite end of the tube 87 and close the contacts, as indicated in Fig. 7, whereupon the motor will start to rotate and will act through worm 75, small worm gear 70, shaft 41 and large worm 43 to cause rotation of the latter in such a direction as to cause the worm to creep along the worm gear 25 in a forward direction or to the right as viewed in Fig. 1. This motion continues until the switch has assumed the position shown in Fig. 8, whereupon the circuit is broken and the relative motion of the worm gear 25 and worm 43 stops.

During this rotation of the worm 43 the weight descends, but during its descent it continues to exert tension on the warp threads, the rate of downward motion of the weight induced by rotation of the motor being so slow as to cause no appreciable reduction in gravitational pull of the weights on the warp.

As already stated the switch characteristics are such that the angular motion of the casing will be approximately 14° and the range of vertical motion of the weights 107 between the top and bottom limits of its motion will be proportioned to and determined by this angular motion. While I have described the switch which in actual practice requires this particular angular displacement, I do not wish to be limited to this amount of angular motion. Such relatively large angle, however, has the advantage of causing only infrequent operation of the motor and the parts are so related that the strain imposed by the weights 107 is substantially constant throughout the specified angular motion.

In order that the angular setting of the mercury switch may be varied and also indicated I employ the structure shown in Fig. 6, where the hollow casing 81 is shown as provided with a sheet metal cover 110 fastened thereto. A plate 111 has a reduced hub 112 extending through and turning in the cover. An indicating finger 113 and a switch carrying clip 114 are held together rigidly by a bolt 115 having a nut 116. A holding screw 117 passes through an arcuate slot in the finger and is threaded into the cover, holding the finger and therefore the switch in any given adjusted position relatively to the casing 81.

From the foregoing it will be seen that I have provided a letoff wherein the warp threads are stressed by a weight movable through a range of motion, motor driven means being provided to return the weight from its upper to its lower limit at such a rate as to maintain substantially uniform tension on the warp threads. It will also be seen that the motor and parts driven thereby are mounted on the casing which rotates concentrically with respect to the worm gear, the large worm 43 remaining in constant engagement with the worm gear and being driven by parts supported by and moving with the casing so that un-interrupted driving connections may exist between the motor and the large worm. It will also be seen that the motor is controlled through the switch, the angular position of which varies with the rotation of the casing and also that the switch is of such a type that a considerable displacement from the horizontal line is necessary before the switch will alter its condition either to make or break the motor circuit. This results in an efficient control for the motor without requiring too frequent starting and stopping thereof.

Having thus described my invention it will be seen that changes and modifications may be made therein by those skilled in the art without departing from the spirit and scope of the invention and I do not wish to be limited to the details herein disclosed, but what I claim is:

1. In a loom let-off, a warp beam rotatable to let-off warp, a worm gear rotatable with the beam when the latter is letting-off warp, a casing rotatable about the center of the worm gear, a worm meshing with the worm gear, a weight to resist rotation of the casing, an electric motor connected to the worm to cause rotation thereof, and a normally open switch to be closed by angular motion of the casing and placed in circuit with the motor to cause rotation of the motor and worm to cause reverse rotation of the casing.

2. In a loom let-off, a warp beam rotatable to let-off warp, a worm gear rotatable with the beam when the latter is letting-off warp, a casing rotatable about the center of the worm gear, a worm meshing with the worm gear, a weight to resist rotation of the casing, an electric motor mounted on the casing and connected to the worm to cause rotation thereof, and a normally open switch to be closed by angular motion of the casing and placed in circuit with the motor to cause rotation of the motor and worm to cause reverse rotation of the casing.

3. In a loom let-off, a warp beam rotatable to let-off warp, a worm gear rotatable with the beam when the latter is letting-off warp, a worm meshing with the worm gear, a casing rotatable about the axis of the worm gear and supporting the worm, an electric motor mounted on the casing and moving therewith, driving connections between the electric motor and the worm, weighted means connected to the casing to resist motion thereof in the direction corresponding to letting-off motion of the warp beam, and an electric switch on the casing normally open but closed by angular motion of the casing to be put in circuit with the motor to cause rotation of the latter and the worm to move the casing in a direction opposite to that in which the beam rotates when letting-off warp.

4. In a loom let-off, a warp beam rotatable to let-off warp, a worm gear rotatable with the beam when the latter is letting-off warp, a worm meshing with the worm gear, a casing supporting the worm and rotatable about the axis of the worm gear, the worm normally causing the casing to rotate with the beam when the latter is lettting-off warp, a normally idle electric motor on the casing, driving connections between the motor and the worm, weighted means to resist motion of the casing with the warp beam, and a switch to be in circuit with the motor but normally open and mounted on and moving with the casing, said switch to be closed by angular motion of the casing, motion of the casing sufficient to cause closing of the switch causing rotation of the motor and worm in a direction to move the casing relatively to the worm gear and in a reverse direction opposite to that in which the warp beam turns when letting-off warp, a predetermined amount of reverse motion of the casing causing the switch to open.

5. In a loom let-off, a warp beam rotatable in a given direction to let-off warp, a worm gear connected to and rotating with the beam, a casing rotatable about the axis of the worm gear, an electric switch mounted on and moving with the casing and dependent for opening and closing thereof upon the angular position of the casing, said casing when having a given angular motion in a direction corresponding to letting-off rotation of the beam causing closure of the switch and said casing when movable in an opposite direction effective to open the switch, a worm meshing with the worm gear and supported by the casing, a motor connected to the worm to cause rotation thereof and controlled by the switch, and weighted means resisting motion of the casing in a direction corresponding to letting-off movement of the beam, rotation of the casing with the beam causing closure of the switch to effect rotation of the motor and worm to cause the latter to move along the periphery of the worm gear to permit the weight to cause rotation of the casing in said opposite direction to open the switch and arrest further rotation of the motor and worm.

6. In a loom let-off, a warp beam rotatable in a given direction to let-off warp, a worm gear connected to and rotating with the beam, a casing rotatable about the axis of the worm gear, an electric switch mounted on and moving with the casing and dependent for opening and closing thereof upon the angular position of the casing, said casing when having a given angular motion in a direction corresponding to letting-off rotation of the beam causing closure of the switch and said casing when movable in an opposite direction effective to open the switch, a worm meshing with the worm gear and supported by the casing, an electric motor normally idle, connections between the motor and the worm to cause the latter to rotate with the motor, and weighted means connected to the casing to resist rotation of the latter and the warp beam in a direction corresponding to the letting-off of warp, said weighted means being raised during the letting-off of warp when the motor is idle, motion of the casing in a direction corresponding to the letting-off of warp closing the switch to start the motor and thereby cause turning of the worm in a direction to permit reverse rotation of the casing and lowering of the weight as the worm feeds along the worm gear, motion of the casing during descent resulting in opening the switch to stop the motor and arrest rotation of the worm and reverse rotation of the casing.

7. In a loom let-off, a warp beam rotatable in a given direction to let-off warp, a worm gear connected to and rotating with the beam, a casing rotatable about the axis of the worm gear, an electric switch mounted on and moving with the casing and dependent for opening and closing thereof upon the angular position of the casing, said casing when having a given angular motion in a direction corresponding to letting-off rotation of the beam causing closure of the switch and said casing when having a predetermined reverse angular motion in an opposite direction effective to open the switch, a worm meshing with the worm gear and supported by the casing, an electric motor supported by the casing and normally idle, connections between the motor and the worm to cause the latter to rotate with the motor, and weighted means connected to the casing to resist rotation of the latter and the warp beam in a direction corresponding to the letting-off of warp and being raised during the letting-off of warp when the motor is idle, said given angular motion of the casing in a direction corresponding to the letting-off of warp closing the switch to start the motor and thereby cause turning of the worm in a direction to permit reverse rotation of the casing and lowering of the weight as the worm feeds along the worm gear, the predetermined angular reverse motion of the casing resulting in opening the switch to stop the motor and arrest rotation of the worm.

8. In a loom let-off, a warp beam rotating in a direction to let-off warp during loom operation, a worm gear movable with the beam in a direction corresponding to warp letting-off during loom operation, a casing rotatable about the axis of the worm gear, a worm supported by and moving with the casing about said axis and meshing with the worm gear, said worm when at rest relatively to the worm gear causing the casing to rotate with said worm gear in a given direction, weighted means to resist rotation of said casing in said given direction and being raised by rotation of said casing in the given direction, a normally open mercury switch supported by and moving with the casing, an electric motor controlled by the switch and connected to the worm to cause rotation of the latter relatively to the worm gear when the motor is running, rotation of the casing in said given direction by a predetermined amount causing closure of the mercury switch to effect rotation of the motor and worm in a direction permitting the weight to give the casing a reverse rotation in a direction opposite to that corresponding to the letting-off motion of the beam until the mercury switch is opened due to reverse angular motion of the casing.

9. In a loom let-off, a beam rotatable to let-off warp, a worm gear rotating with the beam when the latter is letting-off warp, a casing rotatable about the axis of the worm gear, a worm supported by and movable angularly with the casing and meshing with the worm gear, said worm gear normally at rest relatively to the worm gear to cause the casing to move forwardly when the worm gear moves with the beam during warp letting-off, an electric motor normally idle and connected to the worm to cause rotation of the latter when said motor is running, and a mercury switch to control the motor mounted on and movable with the casing and dependent for opening and closing upon angular position thereof, and weighted means resisting forward rotation of the casing with the worm gear, a given angular motion in a forward direction of the casing causing closure of the mercury switch to start the motor and cause feeding of the worm along the worm gear in a direction to permit the weighted means to cause reverse motion of the casing, a given reverse motion of the casing opening the mercury switch to arrest rotation of the motor and worm, whereupon the worm causes the casing and worm gear again to move together angularly.

10. In a loom let-off, a beam rotatable to let-off warp, a worm gear rotating with the beam when the latter is letting-off warp, a casing rotatable about the axis of the worm gear, a worm supported by and movable angularly with the casing and meshing with the worm gear, said worm gear normally at rest relatively to the worm gear to cause the casing to move forwardly when the worm gear moves with the beam during warp letting-off, a normally idle electric motor mounted on and moving with the casing and connected to the worm to cause rotation of the latter when said motor is running, and a normally open switch to be closed by angular motion of the casing, said switch to control the motor and mounted on and movable with the casing and dependent for opening and closing thereof upon angular position of the casing, and weighted means resisting forward rotation of the casing, a given angular motion in a forward direction of the casing causing closure of the mercury switch to start the motor and cause feeding of the worm along the worm gear in a direction to permit the weighted means to cause reverse motion of the casing, and a given reverse motion of the casing opening the mercury switch to arrest rotation of the motor and worm, whereupon the worm causes the casing and worm gear again to move together angularly.

11. In a loom let-off, a warp beam rotatable forwardly to let-off warp, a worm gear to rotate with the beam in a given direction when the beam rotates forwardly, a normally idle worm meshing with and moving about the axis of the worm gear, a support for the worm rotatable about the axis of the worm gear, a normally idle electric motor connected to the worm to cause turning thereof relatively to the worm gear when the motor is running, a normally open switch to control the motor and to be closed by a predetermined angular motion of the support in said given direction to cause rotation of the motor and worm and said switch to be opened by a predetermined reverse motion of the support opposite to said given direction to arrest rotation of the motor and worm, and weighted means connected to the support to resist motion of the latter in said given direction.

12. In a loom let-off, a warp beam rotatable forwardly to let-off warp, a worm gear connected to and moving with the warp beam in a given direction when said beam rotates forwardly, a normally idle worm meshing with the worm gear, a support for the worm to cause the latter to move in one direction in a given path when idle due to rotation of the worm gear in said given direction, weighted means to resist motion of the worm in said one direction along said given path, a normally idle electric motor connected to the worm, and a normally open switch controlling the motor to be closed after a predetermined angular motion of the worm gear in said given direction to cause rotation of the motor and worm in a direction to feed the worm along the worm gear and said given path in a direction opposite to said one direction.

13. In a loom let-off, a warp beam rotatable forwardly to let-off warp, a worm gear connected to the beam and rotating in a given direction when the beam rotates forwardly, a normally idle worm meshing with the worm gear, means to cause the worm to move bodily in one direction in a given path when idle due to rotation of said worm gear in the given direction, weighted means to resist motion of the worm when idle in said one direction along said given path, an electric motor connected to the worm to turn the latter and cause the same to move bodily in a direction opposite to said one direction, and a normally open switch controlling the motor to be closed after a predetermined angular motion of the worm gear to cause the motor and worm to turn.

14. In a loom let-off, a warp beam rotatable forwardly to let-off warp, a worm gear connected to the beam and rotatable therewith in a given direction when the beam rotates forwardly, a worm meshing with the worm gear and normally held against rotation and movable bodily in a forward direction by the worm gear when the latter rotates in said given direction, weighted means to resist motion of the worm forwardly along said given path, a normally idle electric motor connected to the worm, and a normally open electric switch to control the motor and to be closed after a predetermined angular motion of the worm gear in said given direction to cause rotation of the motor and worm in a direction to feed the worm bodily along the worm gear and said given path in a backward direction.

15. In a loom let-off, a warp beam rotatable forwardly to let-off the warp, a worm gear connected to the beam and rotatable in a given direction when the beam rotates forwardly, a worm meshing with the worm gear and normally held against rotation, a support for the worm movable with the latter along a given path in a forward direction due to rotation of the worm gear in said given direction when the worm is held against rotation, weighted means to resist forward motion of the worm and support along said given path, a normally idle electric motor connected to the worm, and a normally open electric switch to control the motor and to be closed by a given motion of the support in a forward direction along said given path to cause rotation of the motor and the worm in a direction to feed the worm along the worm gear along said given path in a backward direction.

OSCAR V. PAYNE.